June 17, 1924.　　　　　　　　　　　　　　　　1,498,064
F. A. APFELBAUM
DISPLAY APPARATUS
Filed Jan. 10, 1922　　　　2 Sheets-Sheet 1
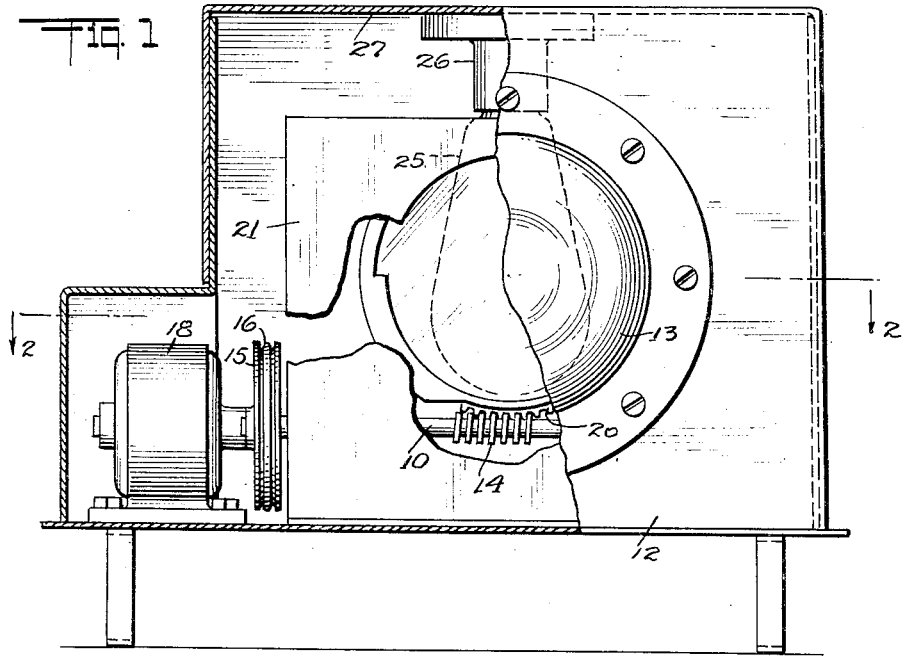
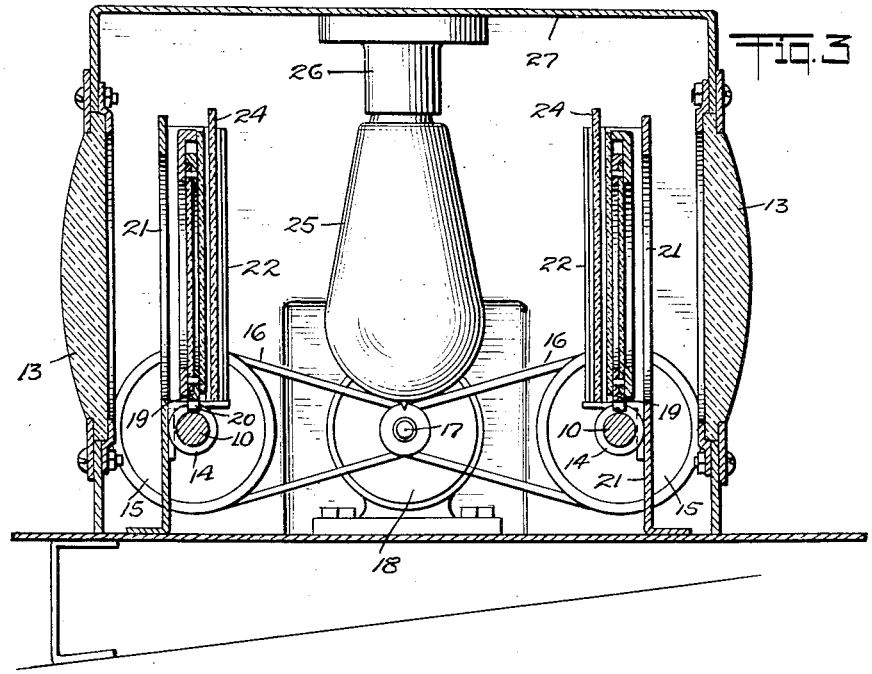
INVENTOR
F. A. Apfelbaum June 17, 1924.
F. A. APFELBAUM
DISPLAY APPARATUS
Filed Jan. 10, 1922
1,498,064
2 Sheets-Sheet 2
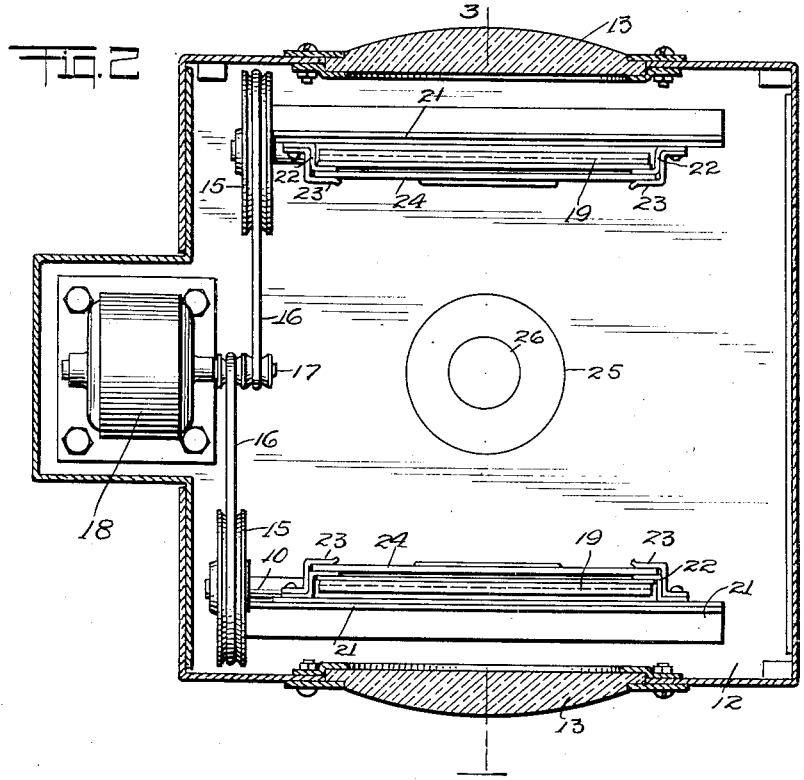
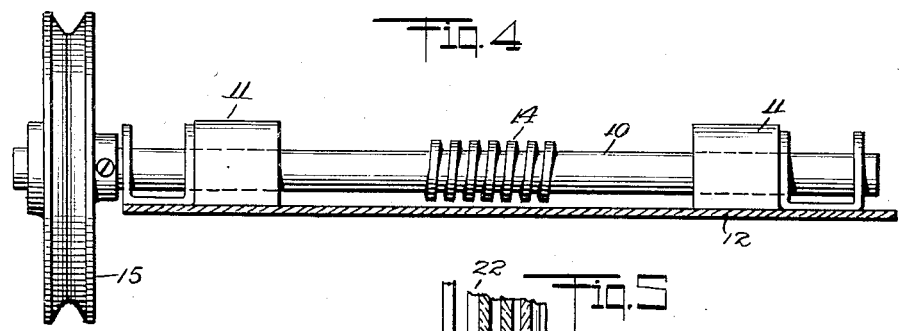
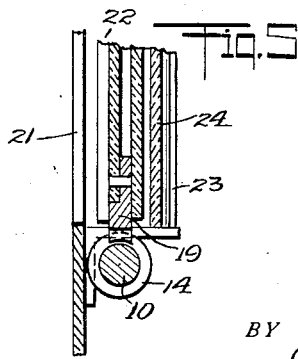
INVENTOR
F. A. Apfelbaum
BY
ATTORNEY Patented June 17, 1924.

1,498,064

UNITED STATES PATENT OFFICE.

FREDERICK A. APFELBAUM, OF WOODMERE, NEW YORK.

DISPLAY APPARATUS.

Application filed January 10, 1922. Serial No. 528,267.

*To all whom it may concern:*

Be it known that I, FREDERICK A. APFELBAUM, a citizen of the United States, and a resident of Woodmere, L. I., in the county of Nassau and State of New York, have invented certain new and useful Improvements in a Display Apparatus, of which the following is a full, clear, and exact description.

Among the principal objects which the present invention has in view are: To provide an apparatus of the character mentioned attractive and requiring only a small attention during the operation; to provide means for enlarging the display to be more readily viewed; to vary the scope of the entertainment furnished by the apparatus; and to simplify and cheapen the construction.

*Drawings.*

Figure 1 is a front view of an apparatus constructed and arranged in accordance with the present invention, the view being partly cut away to disclose the interior construction thereof.

Figure 2 is a horizontal section thereof, the section being taken on the line 2—2 in Fig. 1.

Figure 3 is a vertical section, the section being taken on the line 3—3 in Fig 2.

Figure 4 is a detailed view on enlarged scale showing one of the driven shafts with which the apparatus is provided.

Figure 5 is a detailed view in section, showing the construction and arrangement of the rotary slide and driving mechanism therefor.

*Description.*

Heretofore, under date of November 3, 1914, a patent for improvements in stereopticon-slide carrier, No. 1,116,201, was granted to me. The present apparatus may be said to be an improvement thereon, and for this reason cross reference is made thereto. While in the patent referred to a single driving shaft having a plurality of engaging members was employed for rotating the rotary or movable member of the kaleidoscopic slides disclosed therein, no display means was employed in conjunction therewith. In the present invention two driven shafts 10 are mounted in bearings 11 at opposite sides of a closing box or case 12 in proximity to and in parallel relation with magnifying lenses 13. Each of the shafts 10 has a worm section 14 and a grooved pulley 15. Both pulleys 15 are operatively connected by means of belts 16 with the driving or armature shaft 17 of a small electric motor 18. By means of the electric motor 18 when energized the shafts 10 are continuously and constantly rotated, and if the worm sections 14 thereon be engaged with the rotary member 19 of the double slide for the display of which the present invention is designed, the said rotary member is also constantly rotated. To this end the member 19 is provided with a metallic frame having gear teeth 20 in the periphery thereof.

Two open-centered racks 21 have lateral guides 22 in which may be introduced the display slides having movable and immovable members as seen best in Figures 2 and 3 of the drawings. A second rack 23 is provided to guide and support a light diffusing plate 24.

The illumination in the present apparatus is an electric-light globe. A screw socket 26 is suitably mounted and preferably pendent from the top 27 of the case 12. Preferably the illuminating center of the globe 25 is aligned with the focal axis of the lenses 13.

By placing the lenses 13 in opposite sides of the case 12 it is obvious that a plurality of entertaining devices may be viewed simultaneously by different people on different sides of the apparatus.

It is also obvious that by changing either the diffusing glass 24 or the slide having the movable member 19, the entertainment or attraction may be at any time varied.

It is obvious that while I have herein disclosed an apparatus employing two sets of slides and magnifying lenses 13 therefor, this may be varied by reducing the display to one element. It is also equally obvious that further provision may be made by extending the shaft 17 of the armature or by connecting the one of the shafts 10 through miter transmission gears with a shaft disposed perpendicular thereto, a third display apparatus could be employed and the effects be simultaneously produced thereby. It is also obvious that by constructing an apparatus in conformity with the present disclosure, an attractive but economical design or entertaining device may be produced.

Claims.

1. An apparatus as characterized comprising oppositely disposed kaleidoscopic stereopticon slides, each of said slides having a rotary element and a stationary element; driven elements for rotating said rotary elements simultaneously; an illuminating member disposed between said slides for projecting light therethrough; a plurality of magnifying lenses disposed in front of said slides, the focal axis of said lenses being coincident with the center of said illuminating member, and a prime mover common to said driven elements and operatively connected thereto.

2. An apparatus as characterized comprising oppositely disposed kaleidoscopic stereopticon slides, each having a rotary worm member, supporting racks for said slides disposed in parallel and spaced relation, a driving mechanism for operating said slides, said driving mechanism embodying parallel driving shafts, each having a worm gear arranged in mesh with said rotary members, an electric motor operatively connected with said shafts for simultaneously rotating the same; and an illuminating member disposed between said slides in line with the center thereof for projecting light therethrough simultaneously.

3. An apparatus as characterized comprising oppositely disposed kaleidoscopic stereopticon slides, each having a rotary worm member, supporting racks for said slides disposed in parallel and spaced relation, a driving mechanism for operating said slides, said driving mechanism embodying parallel driving shafts, each having a worm gear arranged in mesh with said rotary members, an electric motor operatively connected with said shafts for simultaneously rotating the same; an illuminating member disposed between said slides in line with the center thereof for projecting light therethrough simultaneously; and a containing case for said slides, and said lighting member, said case supporting in operative relation said lighting member.

4. An apparatus as characterized comprising oppositely disposed kaleidoscopic stereopticon slides, each having a rotary worm member, supporting racks for said slides disposed in parallel and spaced relation, a driving mechanism for operating said slides, said driving mechanism embodying parallel driving shafts, each having a worm gear arranged in mesh with said rotary member, an electric motor operatively connected with said shafts for simultaneously rotating the same; an illuminating member disposed between said slides in line with the center thereof for projecting light therethrough simultaneously; a containing case for said slides and said lighting member, said case supporting in operative relation said lighting member centrally from the upper side thereof; and magnifying lenses structurally mounted in said supporting case for alignment with said slides and said lighting member.

5. An apparatus as characterized, comprising a casing, projection lens mounted in the walls of said casing at the opposite sides thereof, racks within said casing and arranged in spaced relation one with respect to the other and to said lens, kaleidoscopic slides supported in said racks, a rotary member mounted in each of said racks for operating said slides, parallel driving shafts operatively connected to said rotating members, an offset portion formed with said casing, a prime mover housed within said offset portion of said casing and operatively connected to said driving shafts for rotating the same simultaneously, and an illuminating member supported from the upper side of said casing and depending between said racks for projecting light through said slides and the lens aligned therewith.

6. An apparatus as characterized, comprising a casing, having side and end walls, projection lens mounted in the opposite side walls of said casing, racks within said casing and arranged in spaced relation one with respect to the other and to said lens, kaleidoscopic slides supported in said racks, a rotary member mounted in each of said racks for operating said slides, parallel driving shafts operatively connected to said rotary members, an offset portion formed medially of the lower side of one of the end walls of said casing, a prime mover housed within said offset portion of said casing and operatively connected to said driving shafts for rotating the same simultaneously, and an illuminating member supported from the upper side of said casing and depending between said racks for projecting light through said slides and the lens aligned therewith.

FREDERICK A. APFELBAUM.